United States Patent [19]

Sim

[11] Patent Number: 5,126,848
[45] Date of Patent: Jun. 30, 1992

[54] CIRCUIT FOR PREVENTING THE INTERFERENCE OF TV CHANNEL 6 BROADCAST

[75] Inventor: Sun-seon Sim, Suwon, Rep. of Korea

[73] Assignee: Samsung Electronics Co., Ltd., Kyunggi, Rep. of Korea

[21] Appl. No.: 579,957

[22] Filed: Sep. 10, 1990

[30] Foreign Application Priority Data

Dec. 31, 1989 [KR] Rep. of Korea .................. 89-21317

[51] Int. Cl.⁵ .............................................. H04N 5/44
[52] U.S. Cl. .................................. 358/188; 358/196; 455/307; 455/286
[58] Field of Search ................ 358/188, 167, 196; 455/307, 295, 296, 333, 286

[56] References Cited

U.S. PATENT DOCUMENTS

| | | | |
|---|---|---|---|
| 3,647,950 | 3/1972 | Yoshikawa | 358/196 |
| 4,031,549 | 6/1977 | Rast et al. | 415/182 |
| 4,276,566 | 6/1981 | Parker | 358/167 |
| 4,287,602 | 9/1981 | Kessler | 455/307 |
| 4,361,909 | 11/1980 | Theriault | 358/196 |

*Primary Examiner*—James J. Groody
*Assistant Examiner*—Glenton B. Burgess
*Attorney, Agent, or Firm*—Cushman, Darby & Cushman

[57] ABSTRACT

A circuit prevents the interference of FM radio broadcasting with TV channel 6 broadcast. The circuit comprises a microprocessor for receiving channel selecting data output from a data input device and outputting phase locked loop (PLL) data. A control signal generating device receives the PLL data and generates a control signal to control an FM trap operation. A trap operation controlling device then controls the operation of an FM trap according to the control signal. According to the present invention, TV channel 6 broadcasting can be received without noise.

8 Claims, 4 Drawing Sheets

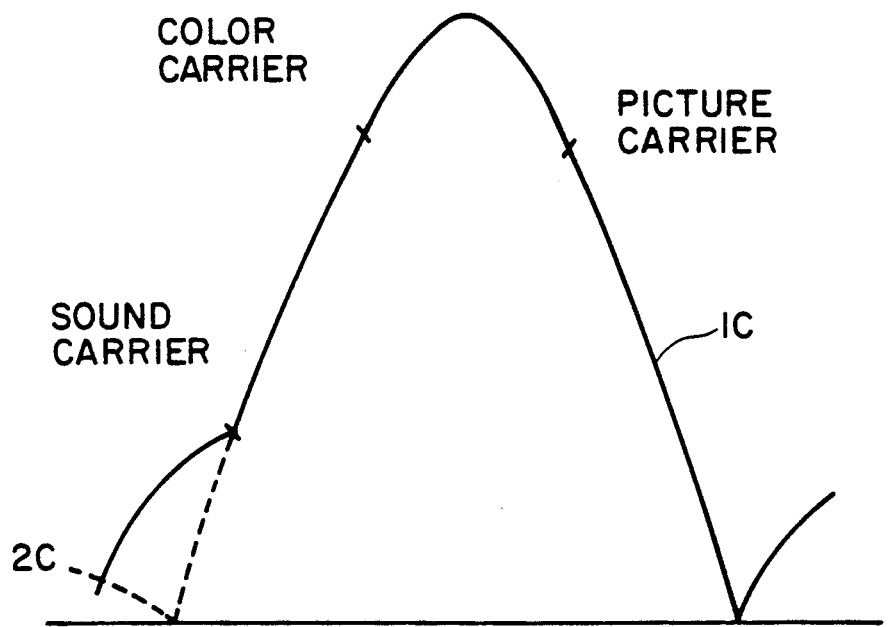

CIRCUIT FOR PREVENTING THE INTERFERENCE OF TV CHANNEL 6 BROADCAST

BACKGROUND OF THE INVENTION

The present invention relates to a circuit for preventing the interference of FM radio broadcasting with the broadcasting of TV channel 6.

Generally, TV channel 6 broadcast receives a low frequency band of 82 to 88 MHz and FM radio broadcasting is allotted a frequency band of 88 to 108 MHz. Thus, the picture carrier of TV channel 6 may be superposed on the FM radio broadcasting resulting in signal interference. Accordingly, a problem exists in that noise is generated from the video signal and the sound signal of television broadcast when the television is tuned to TV channel 6.

SUMMARY OF THE INVENTION

Accordingly, an object of the present invention is to provide a circuit for preventing FM radio broadcasting signal from interfering with the TV channel 6.

In achieving the object, the present invention provides a circuit having a microprocessor which receives channel selecting data output from a data input section and then outputs phase locked loop (PLL) data. A control signal generating device receives the PLL data and generates a control signal to control an FM trap operation. A trap operation controlling device then controls the FM trap operation based on the control signal.

BRIEF DESCRIPTION OF THE DRAWINGS

The above object and other advantages of the present invention will become more apparent by describing the preferred embodiment of the present invention with reference to the following figures:

FIGS. 1A–3A are partial waveform diagrams of the circuit shown in FIG. 1;

FIG. 3 is an operational flowchart of the circuit according to the present invention; and FIG. 4 is a diagram showing an intermediate frequency characteristic curve according to the present invention.

DESCRIPTION OF THE PREFERRED EMBODIMENT

Figure 1:
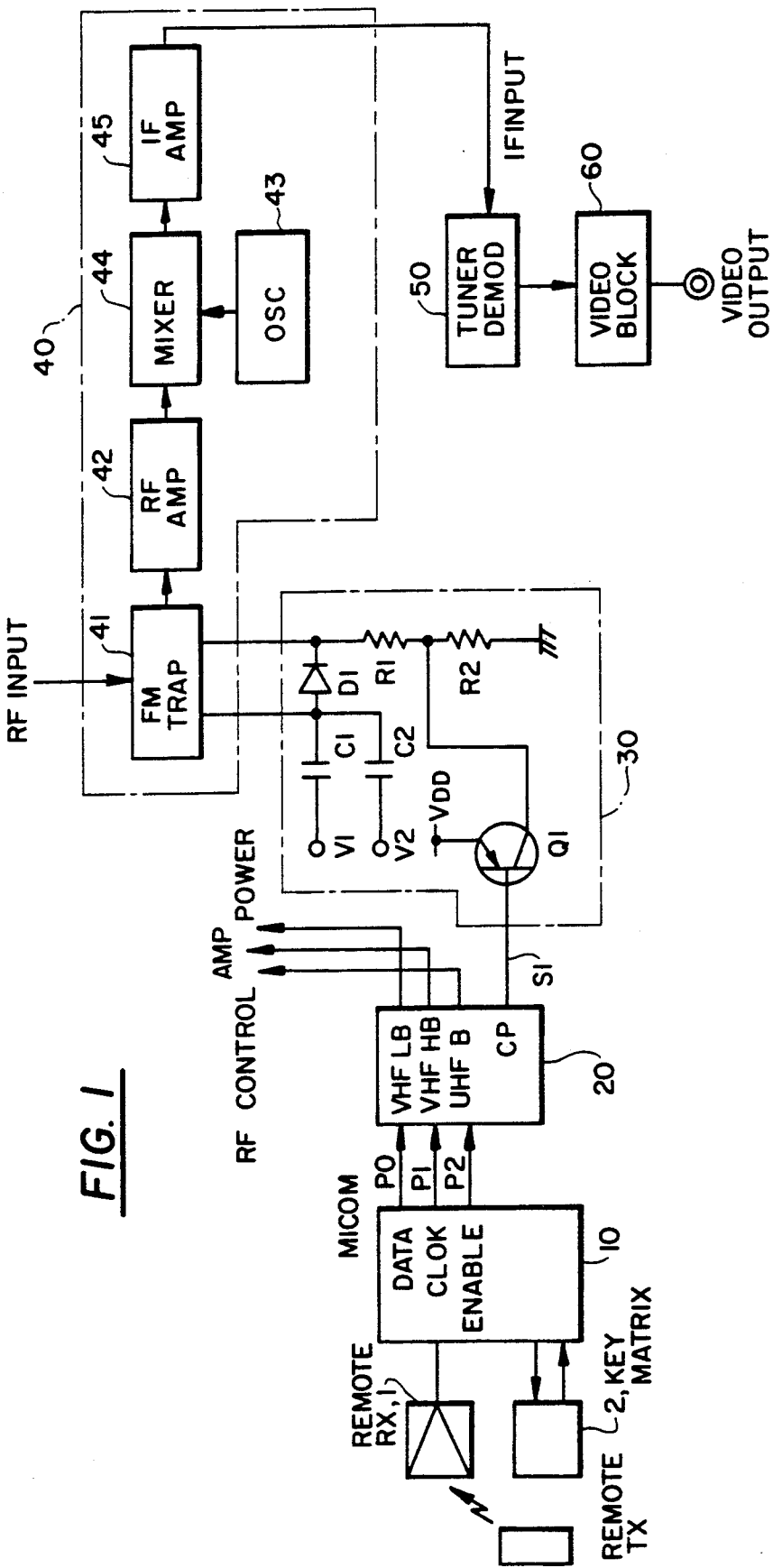
FIG. 1 shows a circuit for preventing the interference of TV channel 6 with FM radio broadcasting according to the present invention.
Figure 1A:
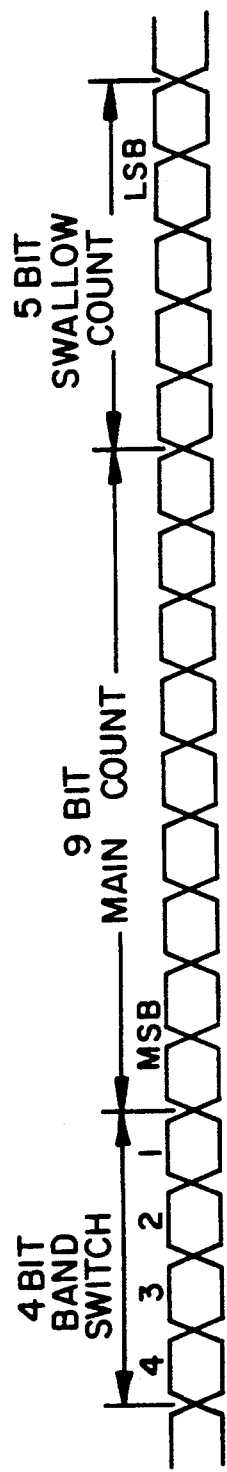

The circuit according to the present invention is shown in FIG. 1. Microprocessor 10 receives channel selecting data from a key matrix 2 or a remote receiver 1 (which receives signals from a remote transmitter) and outputs phase locked loop (PLL) data.

A control signal generating device 20 is connected to the output terminal of the microprocessor 10 to receive the PLL data. The control signal generating device 20 controls band selection, turning and an FM trap.

A trap operation controlling device 30 is connected to the output port $\overline{CP}$ of the control signal generating device 20. The trap operation controlling device 30 has a transistor Q1 which switches based on the level of the control signal output from the output port $\overline{CP}$. The transistor Q1 operatively connects a power source V1 for a VHF to a ground terminal via respective capacitors C1 and C2, diode D1 and serially connected resistors R1 and R2.

The tuner 40 is coupled to the trap operation controlling device 30. An FM trap 41 of the tuner 40 is connected to the front terminal of an RF amplifier 42 and to the rear terminal of the trap operation controlling section 30 so that, when the TV channel 6 is selected, an FM carrier can be removed. A mixer 44 is coupled to receive inputs from the RF amplifier 42 and a local oscillator 43. The mixer 44 outputs a signal to an IF amplifier 45.

The tuner demodulating device 50 receives the intermediate frequency signal output from the IF amplifier 45, demodulates the signal, and then outputs a demodulated signal to a video processing device 60.

Figure 2A:
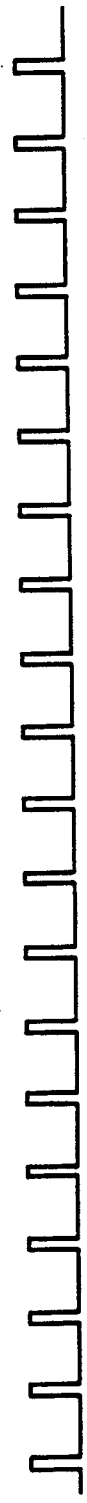

FIG. 2 illustrates three waveforms representing the PLL data signal PO, the clock signal P1, and the enable signal P2 output from the microprocessor 10 of the circuit shown in FIG. 1.

Figure 3A:
Figure 3:
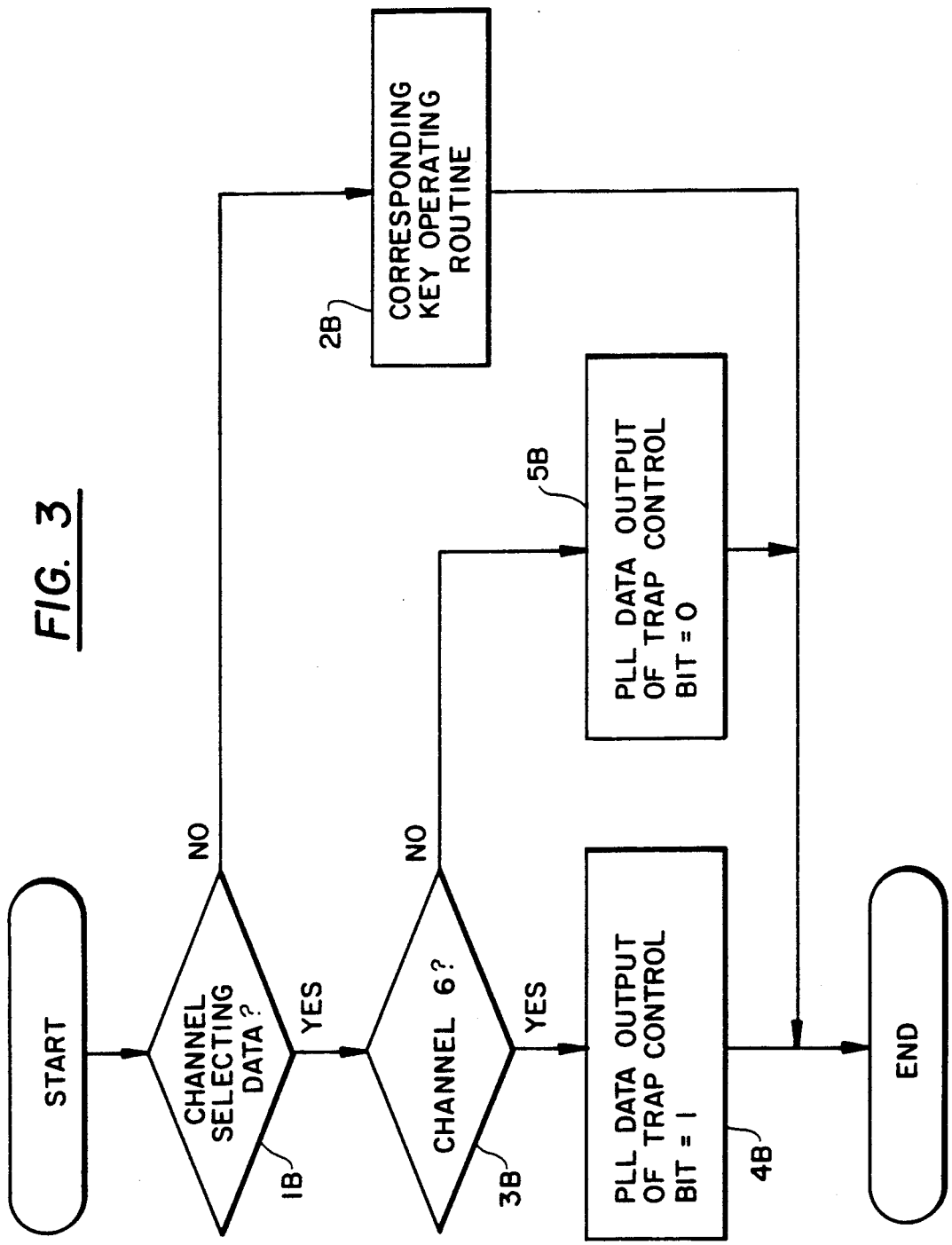

FIG. 3 is a flow chart demonstrating the operation of the circuit shown in FIG. 1.

FIG. 4 illustrates intermediate frequency characteristic curves 1c and 2c in which the curve 1c is shown with trap and the curve 2c is shown without trap.

The operation of the present invention will now be described with reference to FIGS. 1–3.

Input data is supplied to the microprocessor 10 via data input devices, such as a remote receiver 1 or a key matrix 2 shown in FIG. 1.

At step 1B, the microprocessor 10 discriminates whether the input data is the channel selecting data. If the input data is not the channel selecting data, the key operating routine corresponding to the input data mode is carried out in step 2B. On the other hand, if the input data is the channel selecting data, determination is made in step 3B whether the channel to be selected is TV channel 6.

According to the channel selecting data discriminated in step 3B, the microprocessor 10 sets the PLL data output of trap control bit to a high level at step 4B, or sets the PLL data output of a trap control bit to a low level at step 5B.

The microprocessor 10 outputs a signal PO, a clock signal P1 and an enable signal P2 having the waveforms shown in FIG. 2. The data signal PO output from the microprocessor 10 comprises 4 bits for a band selection, 9 bits for a main count for dividing the oscillating frequency output from the local oscillator 43 in the tuner 40 as a reference frequency of the selecting channel, and 5 bits for a swallow count for automatically fine tuning (AFT) the channel. These data bits are output in series and supplied to the control signal generating device 20. Thus, when the channel is confirmed as TV channel 6 in the step 3B, the third bit of the first four bits of data signal PO, which represent the band selecting data, is output as a "high" level.

The 18 bits of the data signal PO are shown in the following table.

TABLE

| | | | |
|---|---|---|---|
| Operation of FM trap 41 does NOT EXIST | 0001 | 010000000 | 10000 |
| Operation of FM trap 41 EXISTS | 0101 | 010000000 | 10000 |

Referring to the above table, the four bits of band selecting data of data signal PO consist of a first bit for controlling a VHF low band switch, a second bit for controlling a VHF low band switch, a second bit for controlling a VHF high band switch, a third bit for controlling an FM trap 41, and a fourth bit for controlling a UHF band switch.

As above described, if TV channel 6 is detected in the step 3B, the FM trap controlling data output from the microprocessor 10 (third bit of the band selecting data) goes "high" as indicated in step 4B (FIG. 3). Then, the control signal S1 output from the control port $\overline{CP}$ of the control signal generating device 20 goes "low". As a result, the transistor Q1 in the trap operation controlling device 30 is turned on causing the potential at the cathode of the diode D1 to go "high". Accordingly, the power supply V1 for a VHF low band and the power supply V2 for a VHF high band are applied to the FM trap 41.

When the voltages V1 and V2 are applied to the FM traps 41, the FM trap 41 operates to control the FM carrier input with an RF signal so as to remove the beat generated by the FM signal band which is similar to the picture carrier of TV channel 6 when TV channel 6 is selected.

The RF signal passing through the FM trap 41 is amplified in the RF amplifier 42, and then mixed in mixer 44 with the oscillating frequency output from the local oscillator 43. At this time, the mixed signal is amplified as an intermediate frequency in the FM amplifier 45, and applied to the demodulating device 50 with the characteristic of intermediate frequency as the curve 2c shown in FIG. 4. The demodulated signal is output as a video signal in the video processing device 60.

On the other hand, if TV channel 6 is not selected in the step 3B, the FM trap controlling data (third bit of the band selecting data) is output as a "low" level from the microprocessor 10 as indicated in step 5B. Then, in contrast with the previously described operation, the transistor Q1 in the control signal generating device 20 is turned off. As a result, the power supplies V1 and V2 are grounded through capacitors C1 and C2, the diode D1, and the resistors R1 and R2 to the ground terminal so that the FM trap 41 does not operate.

The present invention has an advantage that the FM trap operates to decrease beat generated by the FM interference signal only when TV channel 6 is selected and thus, enable the reception of the frequency of TV channel 6 without noise.

What is claimed is:

1. A circuit for preventing interference by an FM broadcast of a TV channel 6 broadcast, comprising:
  a microprocessor for receiving channel selecting data and outputting phase locked loop data in response thereto, said phase locked loop data comprising a serial string of bits including a first number of bits for selecting a frequency band, a second number of bits representing a main count for use by a local oscillator in a tuner, and a third number of bits representing a swallow count for automatically fine tuning a selected channel;
  control signal generating means, coupled to said microprocessor to receive said phase locked loop data, for generating a control signal; and
  trap operation controlling means, operatively coupled to said control signal generating means, for selectively turning on an FM trap used in a tuner in response to a first level of said control signal.

2. A circuit according to claim 1, wherein said trap operation controlling means comprises:
  means for supplying a predetermined voltage to said FM trap when said control signal is at a first level, and for preventing supply of said predetermined voltage to said FM trap when said control signal is at a second level, said FM trap operating only when supplied with said predetermined voltage.

3. A circuit according to claim 1, wherein said serial string of bits consists of 4 bits for selecting a frequency band, 9 bits for representing a main count for use by said local oscillator, and 5 bits for representing a swallow count for automatically fine tuning a selected channel.

4. A circuit according to claim 3, wherein one of said 4 bits for selecting a frequency band is a bit for controlling operation of said FM trap.

5. A circuit according to claim 3, wherein said 4 bits for selecting a frequency band provide VHF low band switching data, VHF high band switching data, FM trap operation controlling data, and VHF band switch controlling data.

6. A circuit according to claim 5, wherein said 4 bits for selecting a frequency band consist of a first bit for switching a VHF low band, second bit for switching a VHF high band, a third bit for controlling FM trap operation, and a fourth bit for controlling an UHF band switch.

7. A circuit according to claim 1, wherein said trap operation controlling means comprises:
  a switching transistor for detecting the first level of said control signal output from said control signal generating means;
  two series resistors commonly coupled at a first node, a first of said series resistors being coupled between the first node and a ground terminal, a second of said series resistors being coupled between the first node and a second node, and a collector of the transistor being connected to the first node;
  a diode having a cathode electrode coupled to the second node and an anode electrode; and
  two capacitors, a first of said two capacitors coupled between the anode electrode of said diode and a first voltage of a VHF low band, and a second of said two capacitors coupled between the anode electrode of said diode and a second voltage of a VHF high band;
  said FM trap being connected to the anode electrode of said diode.

8. A circuit for preventing interference by an FM radio broadcast of a TV channel 6 broadcast, comprising:
  a microprocessor for receiving channel selecting data and outputting phase locked loop data in response thereto;
  control signal generating means, coupled to said microprocessor to receive said phase locked loop data, and generating a control signal in response thereto;
  trap operation controlling means, operatively coupled to receive said control signal from said control signal generating means; and
  a tuner operatively coupled to said trap operation controlling means, said tuner having an FM trap;
  said trap operation controlling means comprising:
    a transistor for placing a voltage potential on a first node in response to said control signal output from said control signal generating means;
    two serially connected resistor, a first of said serially connected resistors being coupled between the first node and a ground terminal, a second of said serially connected resistors being coupled between the first node and a second node;

a diode having a cathode electrode coupled to the second node and an anode electrode; and two capacitors, a first of said two capacitors coupled between the anode electrode of said diode and a first voltage of a VHF low band, and a second of said two capacitors coupled between the anode electrode of said diode and a second voltage of a VHF high band;

said FM trap being connected to both the anode and the cathode electrodes of said diode.

* * * * *